(12) United States Patent
Holland

(10) Patent No.: US 7,106,844 B1
(45) Date of Patent: Sep. 12, 2006

(54) SYSTEM AND METHOD FOR IDENTIFYING CONTAMINATED TELEPHONE NUMBERS AND CORRECT LRN UNDER NUMBER POOLING

(75) Inventor: Roderick Holland, Jonesboro, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 463 days.

(21) Appl. No.: 09/963,918

(22) Filed: Sep. 26, 2001

(51) Int. Cl.
  *H04M 3/42* (2006.01)
  *H04M 7/00* (2006.01)
  *H04B 7/00* (2006.01)

(52) U.S. Cl. .................... 379/201.01; 379/221.13; 455/518

(58) Field of Classification Search ........... 379/221.13, 379/201.01; 455/518; 370/467
See application file for complete search history.

(56) References Cited

U.S. PATENT DOCUMENTS

| | | | |
|---|---|---|---|
| 6,047,056 A * | 4/2000 | Patel | 379/221.13 |
| 6,097,801 A * | 8/2000 | Williams et al. | 379/221.13 |
| 6,353,621 B1 * | 3/2002 | Boland et al. | 370/467 |
| 6,876,865 B1 * | 4/2005 | Sanger | 455/518 |

* cited by examiner

*Primary Examiner*—Wing Chan
*Assistant Examiner*—Thjuan P. Knowlin
(74) *Attorney, Agent, or Firm*—Lee & Hayes, PLLC

(57) ABSTRACT

A service provider's system components such as but not limited to a billing system and facilities maintenance system are sent a message that identifies contaminated telephone numbers contained within a block of numbers released to a service provider from a number pooling authority. The message also identifies the (location routing number) LRN associated with the switch of the uncontaminated numbers.

13 Claims, 5 Drawing Sheets

SYSTEM AND METHOD FOR IDENTIFYING CONTAMINATED TELEPHONE NUMBERS AND CORRECT LRN UNDER NUMBER POOLING

FIELD OF THE INVENTION

The present invention relates to the field of telecommunications and in particular to notifying components of a service provider of active telephone numbers contained within a received block of numbers. More particularly, the present invention relates to notifying components of a service provider of the correct location routing number to associate with each useable number in a block received by a service provider from a number pool.

BACKGROUND

The North American Numbering Plan (NANP) was established in the early 1940's, when American Telephone and Telegraph (AT&T) realized that the expansion of long distance calling should be consistent with the ultimate incorporation of all public switched telephone networks into an integrated nation-wide network. Under the NANP, the United States and Canada were divided into eighty-three "zones," called Numbering Plan Areas (NPAs), where each area is identified by three digits referred to as "Numbering Plan Area codes" or "area codes."

Within each zone or area code, a central office is represented by another three-digit code called the central office code (NXX). The central office code is used for routing calls and for rating and billing calls. Finally, a 4-digit number identifies the particular telephone line on the central office switch. Thus, in the United States, a telephone number is composed of a 3-digit numbering plan area code (NPA), a 3-digit central office code (NXX), and a 4-digit line number (XXXX).

The rapid growth of new telecommunication services over the past several years, exacerbated by the former practice of distributing numbers to service providers in blocks of 10,000 numbers, resulted in the rapid depletion of available telephone numbers. To appreciate the rapid growth of use of telephone numbers, consider that in the ten-year period between 1984 and 1994, only nine new area codes were activated while in 1997 alone, 32 new area codes were activated.

Even in the area codes that are experiencing depletion, however, it is estimated that a relatively low percentage of individual telephone numbers are actually assigned to customers. Furthermore, typically the same service provider will have pockets within the service provider's service area where there are more customers than available numbers and other pockets where there are more telephone numbers than are needed. Hence, a need existed to make more efficient use of numbering resources.

To address this problem, the Federal Communications Commission (FCC), in order number FCC 99-122 issued under the Telecommunications Act of 1996, mandated Number Pooling, a system for reporting and allocating numbers in blocks of 1,000 telephone numbers instead of blocks of 10,000 telephone numbers. The FCC requires the donation of all blocks held by service providers if the blocks have a "contamination" level of less than 10%. A contaminated number is a number that is not available for assignment (e.g., the number is already in use). Blocks are donated to the pool for the rate area from which the numbering resources are assigned. All Local Number Portability (LNP)-capable service providers must participate. Number portability refers to the ability of users of telecommunications services to retain, at the same location, existing telecommunications numbers without impairment of quality, reliability, or convenience when switching from one telecommunications carrier to another.

An Industry Inventory Pool is maintained in thousands-block (i.e., a block of a thousand numbers) number pooling. The pool contains groups of unassigned blocks of a thousand numbers in a given rate area and is administered by a Pooling Administration (PA) for purposes of assignment to certified carriers participating in thousands-block number pooling.

The Pooling Administration is an independent third-party entity. The FCC mandates the accounting for and reporting of all numbering resources in six primary categories. Service providers must maintain records on number usage and report semi-annually to the Pooling Administration. The Pooling Administrator tracks numbering resources and manages the donation and assignment of numbering blocks within the pool based on the information obtained within the records.

At the time a service provider donates a block of numbers to the pool, the service provider must inform the Number Portability Administration Center (NPAC) of the contaminated telephone numbers contained within the donated block. Contaminated telephone numbers, as stated above, are those telephone numbers that are not available for assignment, for example: numbers that are already in use. Upon receiving a block of numbers from a service provider, NPAC broadcasts a message to all providers, listing the contaminated (active) numbers.

A service provider can also request a block of numbers from the Pooling Administration, based on the needs of the service provider. The Pooling Administrator coordinates the allocation of numbers to a particular service provider with the Number Portability Administration Center (NPAC) service management systems (SMSs). The NPAC SMSs are regional databases that contain all necessary routing information on ported telephone numbers and facilitate the updating of the routing databases of all subtending service providers in the portability area.

If the Pooling Administration approves the request, the Pooling Administration requests NPAC to release a block of numbers to the requesting service provider. When NPAC releases the block to the service provider, NPAC broadcasts a message to all the service providers so that the service providers can update their switches so that calls can be routed correctly. Contained within the message is: the area code, central office code and the leading digit of the released thousand-block, the local routing number (LRN) of the donating service provider's switch, global title translation (GTT) which identifies the features available on the switch, and an identifier for the receiving service provider. The message broadcast by NPAC is not directed to components of the service provider such as the billing system and facilities systems mentioned above. Furthermore, the message broadcast by NPAC does not contain a list of contaminated numbers in the block and likewise does not contain the LRN of the receiving service provider's switch, but instead contains the LRN of the donating service provider's switch. As a result, components (such as facilities management and billing components) of the receiving service provider and other service providers may not know the LRN of the switch to which the uncontaminated numbers will be attached, and will not know what numbers in the block are already in use.

Hence a need exists to overcome the drawbacks of the prior art. In particular, a need exists for a system and method for providing components of a service provider with a list of contaminated numbers and for informing components of a service provider with the LRN of the switch to which the uncontaminated numbers will be attached.

SUMMARY OF THE INVENTION

A system and method are disclosed in which components of a service provider are notified of the correct LRN to be associated with a block of numbers received by a service provider and in which a list of active numbers contained within the block are identified.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

Figure 1:
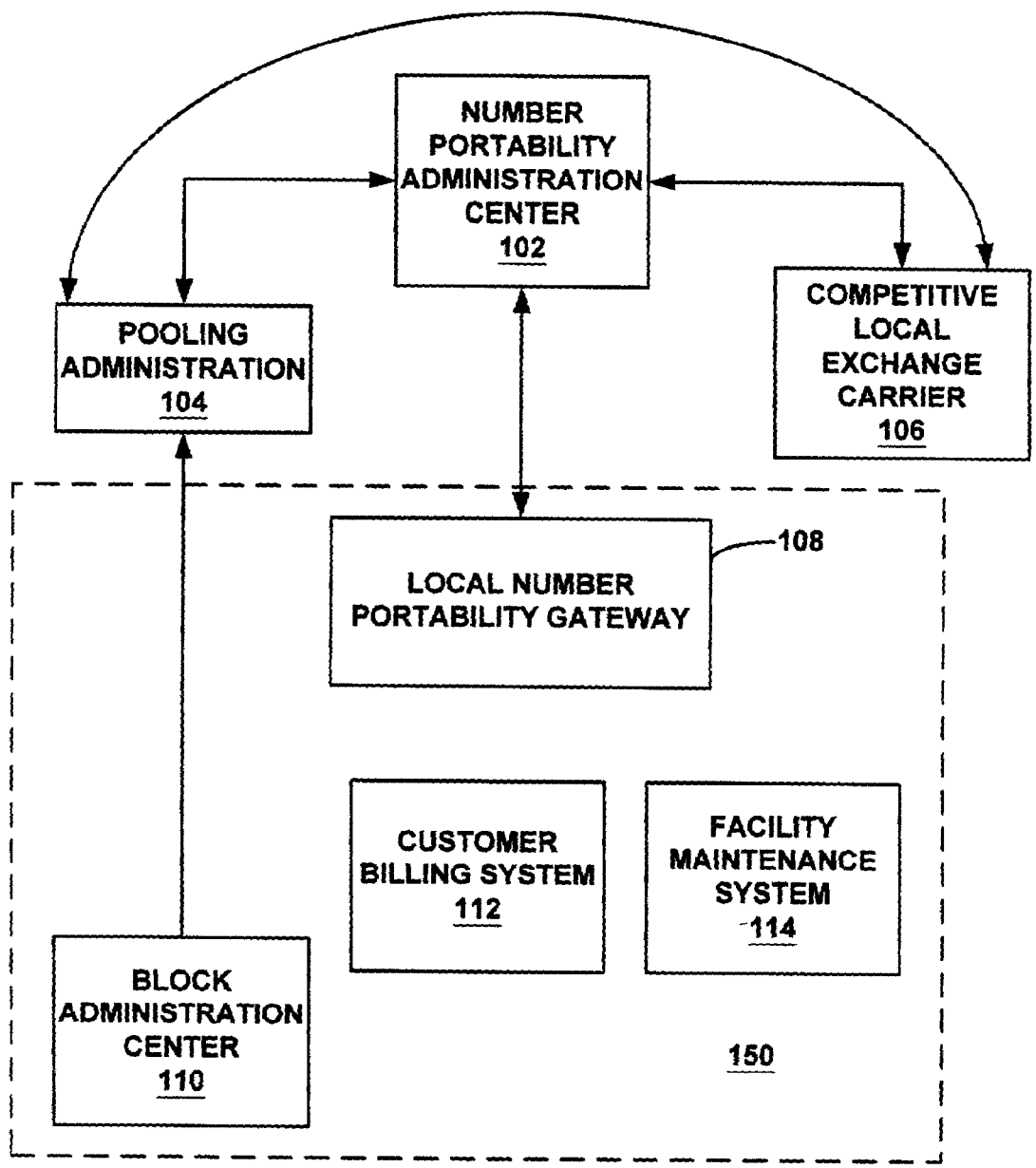
FIG. 1 is a block diagram of an exemplary telecommunications environment as is known in the art.

As described above, the FCC mandated Number Pooling in an effort to make efficient use of available telephone numbers. FIG. 1 illustrates an exemplary telecommunications environment in which Number Pooling has been implemented. Referring now to FIG. 1, Number Portability Administration Center (NPAC) 102 is communicatively coupled to Pooling Administration (PA) 104, to Competitive Local Exchange Carrier (CLEC) 106, to Local Number Portability (LNP) Gateway (GW) 108 of service provider 150 and to Block Administration Center (BAC) 110 of service provider 150. Service provider 150 may also contain components such as but not restricted to a billing system (BS) 112, and a facilities maintenance system (FMS) 114, which are not in direct communication with NPAC 102 and PA 104.

PA 104 is a third-party entity that tracks telephone number resources and manages the donation and assignment of numbering blocks within the pool. PA 104 coordinates with NPAC 102 the receipt and release of blocks of numbers. NPAC 102 downloads all location routing number (LRN) data to a local service management system (SMS) database (not shown) that supports the routing of all telephone calls in North America. Each switch in a telecommunication network is assigned a unique LRN, and a call to a particular telephone number associated with a switch may in part be routed to the switch based on obtaining knowledge of the LRN of the switch based on the telephone number and an appropriate database. All telecommunication carriers (such as CLEC 106 and service provider 150) connect to NPAC 102 and periodically receive from NPAC 102 current telephone number and LRN information.

Local Number Portability (LNP) Gateway (GW) 108, and Block Administration Center (BAC) 110 are components of service provider 150. LNP GW 108 is an interface between NPAC 102 and components of a service provider 150, such as BAC 110, and others. BAC 110 is communicatively connected to PA 104 and is the component of service provider 150 responsible for identifying and donating blocks to PA 104.

Service provider 150 may include other components such as but not limited to components such as BS 112 and FMS 114. BS 112, for example, may be a customer billing system that contains information such as customer name, customer address, and services to which the customer has subscribed and is used to generate customer bills. Typically, the account number is the telephone directory number of the telephone line of the customer.

FMS 114 may be a customer facilities system, containing information such as customer name, customer address, customer equipment data and so on and is used to schedule maintenance, repair and installation of new telecommunications equipment and services. Typically, the account number is the telephone directory number of the telephone line of the customer.

Figure 2:
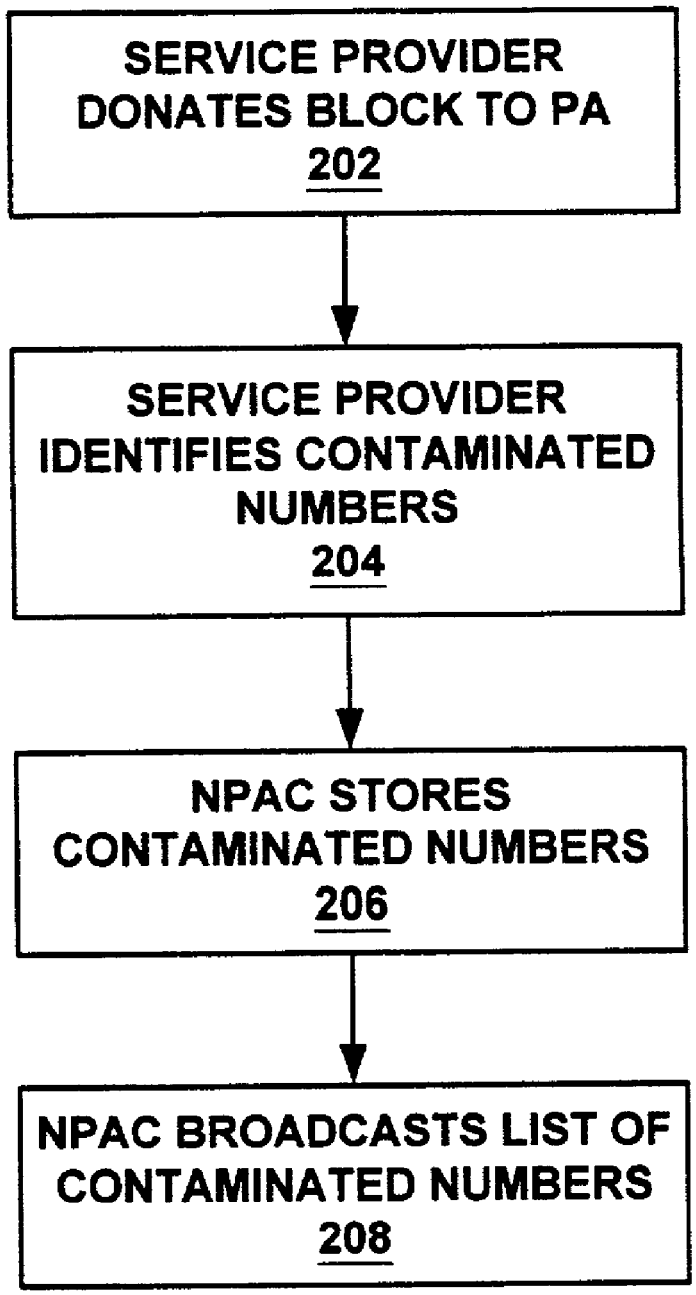
FIG. 2 is a flow diagram of a method of donating blocks of telephone numbers to a pooling administration, as is known in the art.

FIG. 2 is a flow diagram of a method for donating a block to PA 104, as is known in the art. In step 202 a service provider such as CLEC 106 (e.g., a local independent carrier), or BAC 110 of service provider 150 donates a block of 1000 numbers to PA 104 in accordance with FCC Order 99-122.

At step 204, CLEC 106 or BAC 110 of service provider 150 provides to NPAC 102 a list of contaminated telephone numbers included within the block of numbers donated to PA 104. As previously discussed, contaminated telephone numbers are those numbers in the donated block that are not available for assignment, (for example, a telephone number which is already in use is a contaminated telephone number). NPAC 102 stores the list of contaminated numbers in a database (not shown) at step 206, and at step 208 broadcasts the list of contaminated (active) numbers to all service providers such as service provider 150 and CLEC 106 in a subscription version (SV) message. The SV also contains NPA NXX-X data (where NPA represents the Numbering Plan Area code, NXX represents the central office code and X represents the first digit of the four digit telephone line number), that identifies the block of telephone numbers donated to the pool, the LRN identifying the donating switch and global title translation (GTT) data that identifies the features available on the donating switch. Accordingly, each receiving service provider and the switch(es) thereof knows that the block of numbers identified by the NPA NXX-X data has been donated by the switch having the identified LRN and that certain telephone numbers contained within the donated block are still associated with the donating switch. The service provider can therefore update appropriate database information accordingly for the purpose of routing calls to the contaminated numbers within the donated block, among other things.

The information concerning the donated block and contaminated numbers is typically not passed on to service provider components such as BAC 110, BS 112 and FMS 114 in part because these components do not require this information. Because the donated block of numbers is not assigned to service provider 150, the customers associated with the telephone numbers contained in the donated block are not the customers of service provider 150. Thus there is no need for service provider 150 to send bills or to schedule maintenance for customers having telephone numbers in the donated block. Additionally, there is no readily available communication pathway between NPAC 102 and components BS 112 and FMS 114 because there is no direct communication link therebetween.

Figure 3:
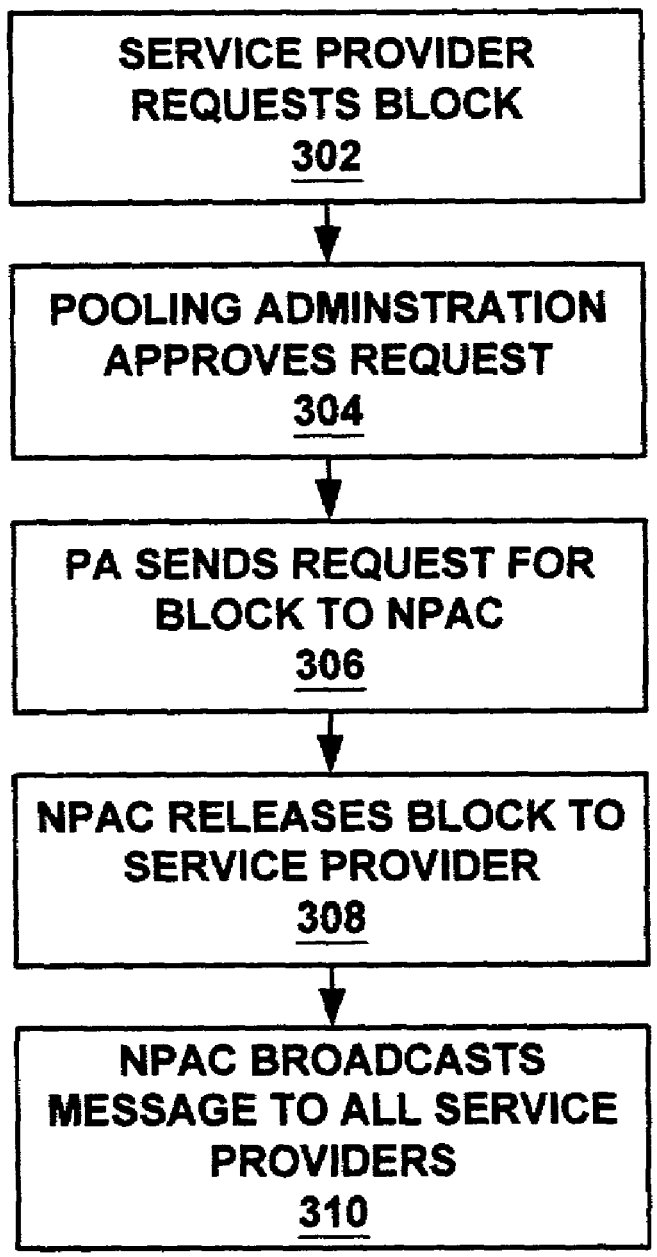
FIG. 3 is a flow diagram of a method of receiving blocks of telephone numbers by a service provider, as is known in the art.

FIG. 3 is a flow diagram of a method for requesting and receiving a block of numbers from NPAC 102, as is known in the art. In step 302 a service provider such as the service provider 150 or CLEC 106 requests a telephone number block for use within a rate center. At step 304 PA 104 approves the request. At step 306 PA 104 requests NPAC 102 to release a block of numbers to the service provider that requested the block of numbers, which for purposes of FIG. 3 will be assumed to be service provider 150. At step 308 NPAC releases a block of numbers to service provider 150. At step 310 NPAC broadcasts a message to all service providers such as service provider 150 and CLEC 106 so that the service providers can update their switches and/or databases as appropriate. The message NPAC 102 sends is a subscription version (SV) and contains the following data: NPA NXX-X (identifying the block of numbers released to the service provider), the identity of the service provider receiving the block of numbers, LRN (the location routing number) assigned to the switch that donated the block of numbers, and global title translation (GTT) indicating what features are available on the switch. The SV does not contain the LRN of the switch to which the released block of numbers will be assigned, nor does the SV contain the numbers in the donated block that are contaminated.

Contaminated Number/New LRN Tracking Adapter

Figure 4:
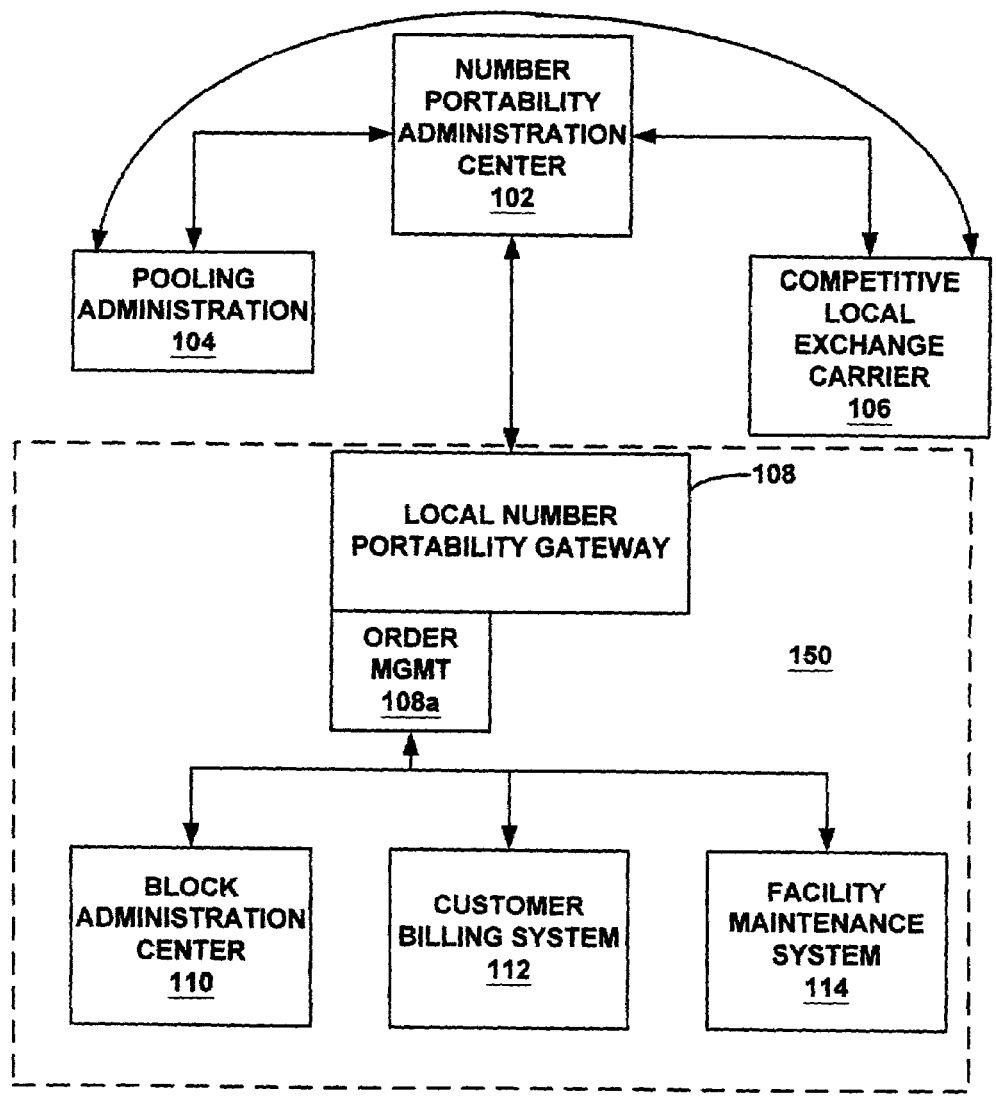
FIG. 4 is a block diagram of an exemplary telecommunications environment in which aspects of the invention may be implemented.

FIG. 4 is a block diagram of an exemplary telecommunications environment in accordance with one embodiment of the present invention. In accordance with the invention, LNP GW 108 is an interface between NPAC 102 and components including but not limited to BAC 110, BS 112 and FMS 114 of a service provider 150. LNP GW 108 includes Order Management System (OMS) 108a. OMS 108a is directly communicatively coupled to BAC 110, BS 112 and FMS 114.

OMS 108a is communicatively coupled to service provider 150 components including but not limited to BAC 110, BS 112 and FMS 114 so that components such as BAC 110, BS 112 and FMS 114 can be updated with information relating to telephone numbers received when service provider 150 has received a new block of telephone numbers.

Figure 5:
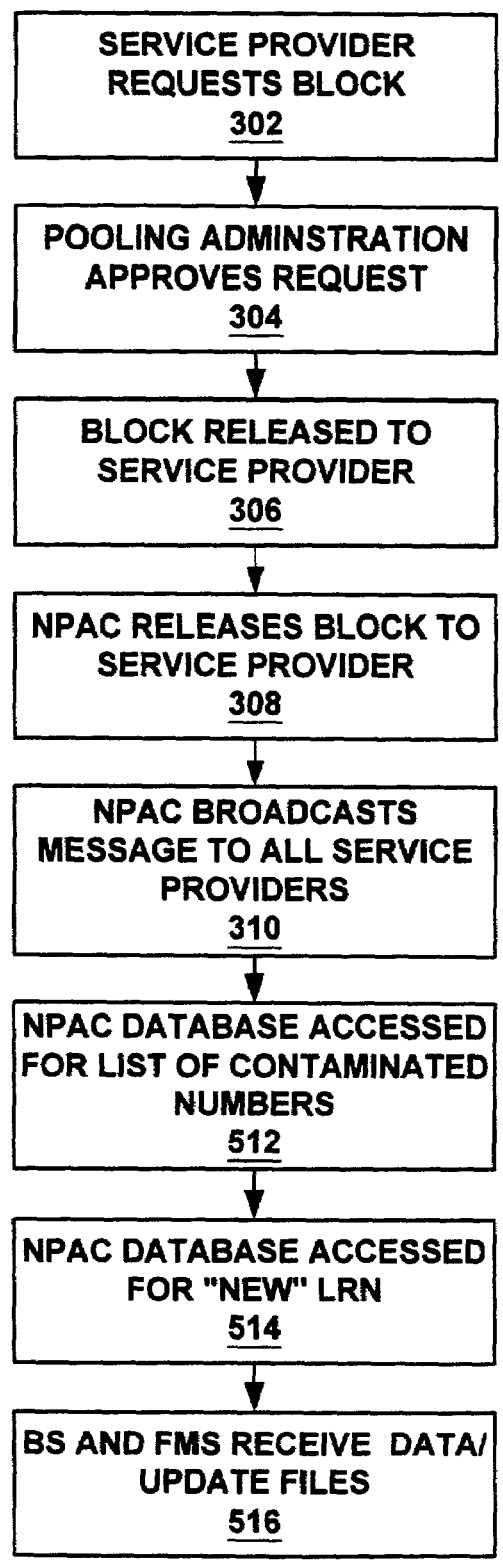
FIG. 5 is a flow diagram of a method of transferring data to components of a service provider concerning routing number and contaminated telephone numbers, in accordance with the invention.

FIG. 5 is a flow diagram in accordance with the invention in which the LRN of the receiving switch is identified and in which a list of contaminated numbers within the block is identified. Steps 302 through 310 proceed as described above. At this point, and as before, each service provider knows a block of telephone numbers is now assigned to a particular service provider Accordingly, in one embodiment of the present invention, following step 310, at step 512, OMS 108a of LNP GW 108 accesses a database at NPAC 102 and retrieves a list of contaminated numbers contained within the received block. At step 514, the LRN to which the block of numbers received from NPAC 102 will be associated is retrieved preferably from a second database, although it should be understood that retrieval of this data from a single database containing both LRN and contaminated number data is contained within the scope of the present invention. At step 516, contaminated number data and the LRN to which the uncontaminated numbers will be associated is sent to service provider 150 components including but not restricted to BS 112 and FMS 114 and appropriate databases at the components are updated.

For example, assume that service provider 150 component BAC 110 has requested a block of numbers at step 302. BAC 110 sends PA 104 a message containing the request for a block of numbers and the LRN of the switch to which the block of numbers will be associated, (in this example, assume that the LRN of the switch to which the block of numbers will be associated is 456). PA 104 approves the request at step 304 and requests NPAC 102 at step 306 to release the block of numbers (215) 469-9XXX, previously donated by a second service provider, CLEC 106. Assume, for the purposes of this example, that the block of numbers (215) 469-9XXX was originally associated with switch LRN 123 at CLEC 106. At step 308, NPAC releases the block of numbers (215) 469-9XXX to service provider 150. At step 310 NPAC 102 sends an SV message containing data identifying service provider 150, LRN=123 (the old LRN), and (215) 469-9XXX, the block of numbers received by service provider 150.

In accordance with one embodiment of the present invention, at step 512, OMS 108a accesses a database at NPAC 102 and retrieves a list of contaminated numbers in block (215) 469-9XXX. These numbers are associated with switch LRN 123. OP 108a accesses (preferably) a second database at NPAC 102 to retrieve the new LRN (456) associated with the switch that will be associated with the block of numbers (215) 469-9XXX. This data is sent in a message via OMS 108a to components such as BAC 110, BS 112, and FMS 114. BAC 110, BS 112 and FMS 114 then update appropriate databases. Assume now that CLEC 106 having donated block (215) 469-9XXX to PA 104, has notified NPAC 102 that the telephone number (215) 469-9000 is contaminated (that is, is in use). BS 112 and FMS 114 would receive the telephone number (215) 469-9000 on a list of contaminated numbers and thus telephone number (215) 469-9000 would not appear in the billing database as a potential account number. Similarly, (215) 469-9000 would not appear in the maintenance database because the customer having telephone number (215) 469-9000 is not a customer of service provider 150.

Similarly, assume now that CLEC 106 having donated block (215) 469-9XXX to PA 104 has not notified NPAC 102 that the telephone number (215) 469-9999 is contaminated. Telephone number (215) 469-9999 is thus designated as "not in use" and can be assigned to service provider 150 as a number which service provider 150 can assign to a new customer. Components BAC 110, BS 112 and FMS 114 verify that telephone number (215) 469-9999 is not contained in the "contaminated number list" and then assign number (215) 469-9999 to LRN 456, the new LRN to which the uncontaminated numbers in the block will be assigned and update appropriate databases.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful mechanism for notifying components of a service provider of the LRN to which numbers in a block of numbers received from a number pool will be associated and of numbers in a block of numbers received from a number pool that are already in use. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. A method comprising:
   requesting a block of telephone numbers from a number pool organization, wherein numbers in the requested block of telephone numbers are to be used by a receiving service provider as both telephone directory numbers and customer identifiers for customers of the receiving service provider, wherein the number pool organization coordinates donation and allocation of blocks of telephone numbers for use by a plurality of service providers comprising the receiving service provider, and other service providers;
   receiving the requested block of telephone numbers from the number pool organization, the received block of telephone numbers comprising a plurality of telephone numbers already in use by the other service providers and a plurality of telephone numbers not already in use by the other service providers;
   retrieving from a database a list comprising the plurality of telephone numbers already in use by the other service providers and therefore unavailable for use as both telephone directory numbers and customer identifiers for customers of the receiving service provider; and
   retrieving from a database, a location routing number of a switch of the receiving service provider associated with the plurality of telephone numbers not already in use by the other service providers and therefore available for use by the receiving service provider as both telephone directory numbers and customer identifiers for customers of the receiving service provider.

2. The method of claim 1, comprising receiving the list comprising the plurality of telephone numbers already in use by the other service providers and the location routing number from a single database.

3. The method of claim 1, further comprising transmitting the list comprising the plurality of telephone numbers already in use by the other service providers to a component of the receiving service provider.

4. The method of claim 3, wherein the component comprises a billing system.

5. The method of claim 3, wherein the component comprises a facility maintenance system.

6. The method of claim 1, further comprising transmitting the location routing number of the switch associated with the plurality of telephone numbers not already in use by the other service providers to a component of the receiving service provider.

7. The method of claim 6, wherein the component is a billing system.

8. The method of claim 6, wherein the component comprises a facility maintenance system.

9. A service provider comprising:
   an order management system for communicating between a number pooling authority and a plurality of further components of the service provider, wherein the service provider is for requesting a block of telephone numbers to be used as both telephone directory numbers and customer identifiers for customers of the service provider, wherein the number pool organization is for coordinating donation and allocation of blocks of telephone numbers for use by a plurality of service providers, including the service provider and further service providers;
   wherein the plurality of further components of the service provider include a block administration center, a customer billing system, and a facility management system, and wherein the order management system is for updating the further components with information relating to telephone numbers that are received when the service provider receives the block of telephone numbers;
   a list of telephone numbers already in use by other service providers and therefore unavailable for use by the service provider, wherein the order management system is for obtaining the list from a database containing the block of telephone numbers received by the service provider; and
   a location routing number of a switch associated with the plurality of telephone numbers not already in use by other service providers and therefore available for use by the service provider as both telephone directory numbers and customer identifiers, wherein the order management system is for obtaining the location routing number from a database containing the block of telephone numbers received by the service provider.

10. The service provider of claim 9, wherein the order management system is for receiving the list of telephone numbers already in use by other service providers and the location routing number from a single database.

11. A computer-readable medium containing computer-readable instructions for performing the method of claim 1.

12. The service provider of claim 9, wherein the order management system updates the plurality of further components of the service provider with the list of telephone numbers already in use by other service providers and the location routing number of the switch associated with the telephone numbers not already in use by other service providers.

13. In a system comprising a number portability administration center, a pooling administrator, and a competitive local exchange carrier, wherein the number portability administration center, the pooling administrator, and the competitive local exchange carrier are adapted to communicate with one another, and further comprising a service provider that communicates with the number portability administration center, wherein the service provider includes a local number portability gateway, a block administration center, a customer billing system, and a facility maintenance system,
   the improvement comprising:
   the local number portability gateway including an order management system component that is an interface between the number portability administration center and the local number portability gateway, the block administration center, the facility maintenance system customer billing system, and the facility maintenance system.

* * * * *